May 25, 1965  S. J. RHODES  3,184,989
CONTROL LEVER HOLDING MEANS
Filed Dec. 31, 1962  2 Sheets-Sheet 2
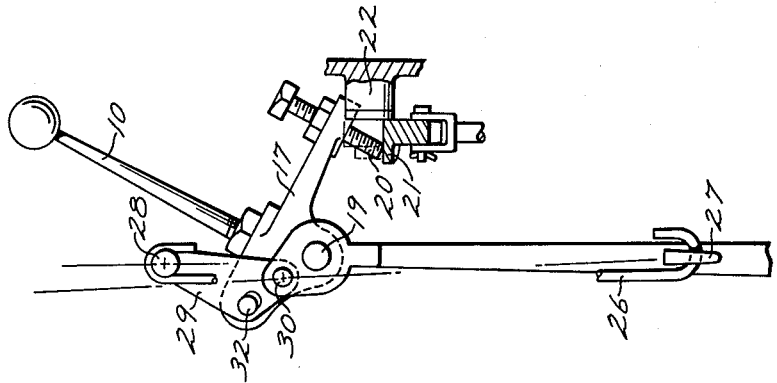
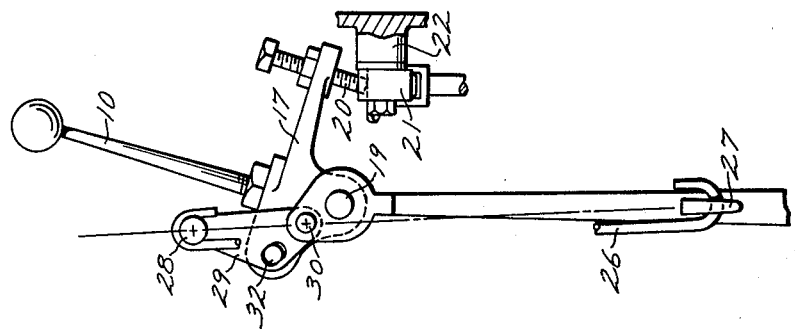
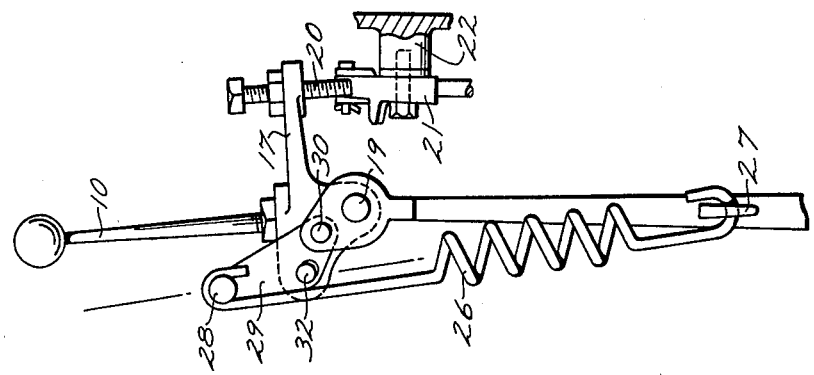
INVENTOR.
SAMMY J. RHODES
BY
ATTORNEYS United States Patent Office 3,184,989
Patented May 25, 1965

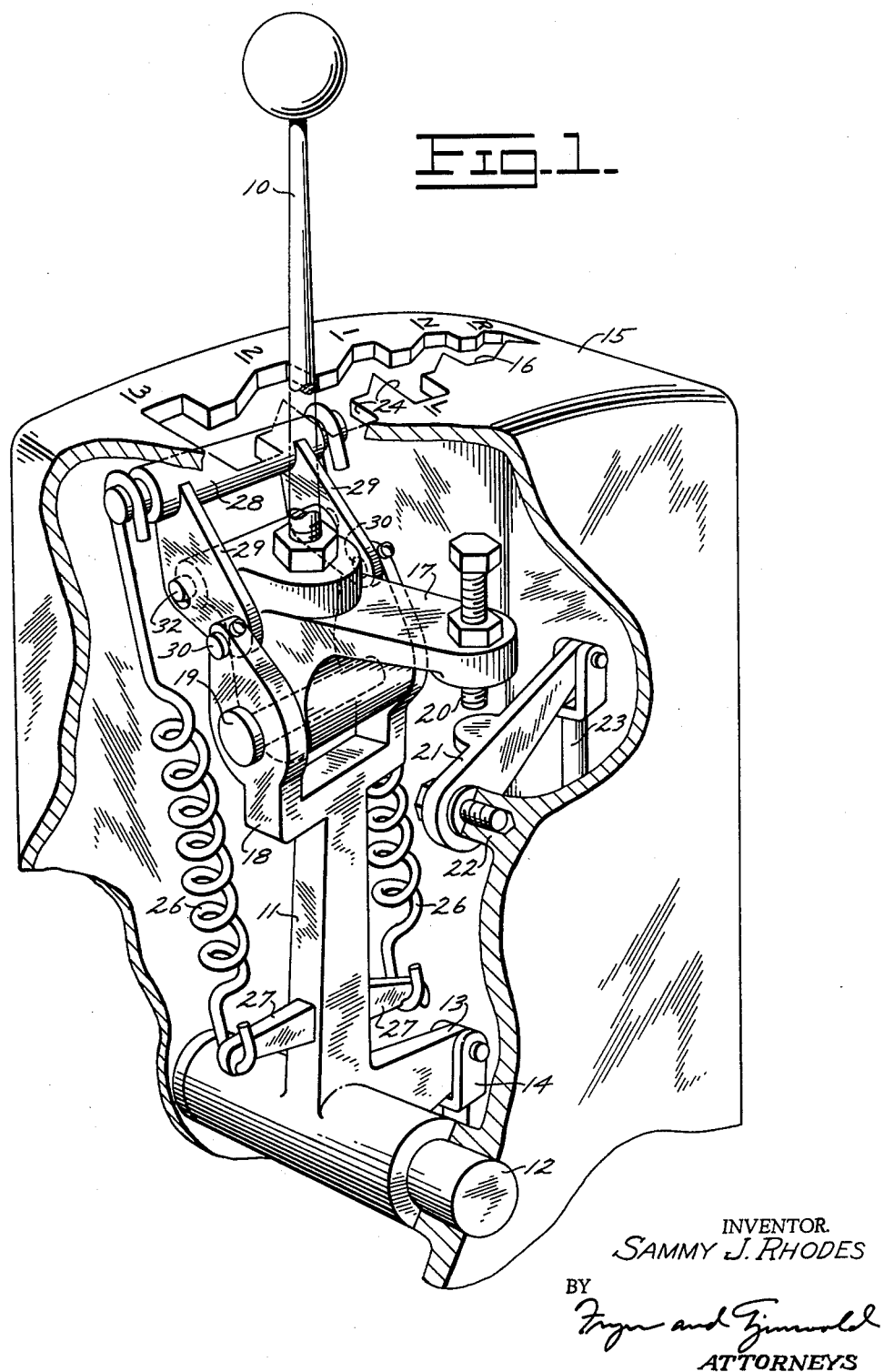

3,184,989
CONTROL LEVER HOLDING MEANS
Sammy J. Rhodes, Decatur, Ill., assignor to Caterpillar Tractor Co., Peoria, Ill., a corporation of California
Filed Dec. 31, 1962, Ser. No. 248,608
1 Claim. (Cl. 74—471)

This invention relates to means for holding a pivoted control lever in either one of two positions between which it is moved or shifted in use.

The invention is applicable to levers used for various purposes and has advantages over many types of detent mechanisms employed for holding levers. It is disclosed herein, however, in specific application to a transmission gear shift lever.

In some transmissions, one of which is disclosed in the application for Letters Patent of Leonard F. Dickeson et al. for "Transmission System and Hydraulic Controls Therefor," Serial No. 49,587, now Patent No. 3,102,831, two transmission units are used in tandem. One unit provides several speed ratios selectable manually by a lever and the other unit provides only high and low ratios selected automatically in response to varying conditions of speed and load. In many cases and particularly in heavy duty machines such as earthmoving tractors and the like, it is desired to lock the second or automatic transmission in its low speed position to prevent it from hunting or rapidly changing ratios when load conditions are rapidly fluctuating. This is accomplished by means disclosed in the above mentioned application wherein a single lever is moved in one plane through three speed positions and a neutral and reverse position for manual selection in one transmission, and is moved in a plane normal to the first plane for preventing the other or automatic transmission from shifting into its high range.

It is the object of the present invention to provide means associated with a control lever for resiliently and forcibly holding it in either one of two positions and in which the resilient means is capable of being overcome by the application of unusually low manual force.

Other objects and advantages and the manner in which the invention is carried into practice are disclosed in detail in the following specification by reference to the accompanying drawings.

In the drawings:

FIG. 1 is a perspective view of a transmission shift lever and associated mechanism with holding means embodying the invention showing a portion of the housing thereof broken away; and FIGS. 2, 3 and 4 are views in elevation of the operable portions of the mechanism shown in FIG. 1 illustrating different positions of the parts during operation.

In FIG. 1 of the drawings, a transmission shifting lever for a combined manual and automatic transmission of the kind referred to above is illustrated as comprising a shifting cane 10 connected with the upper end of a lever or bell crank 11 which is mounted for rocking movement on a shaft 12. The lower end of the lever 11 is shown at 13 is connected by a clevis 14 with means for shifting a manually controlled transmission through first, second and third positions as well as through neutral and reverse as indicated by indicia on the top of a housing 15 adjacent a slot 16 therein through which the lever moves. The shifting cane 10 is also connected with a T-shaped lever 17 pivoted with respect to a yoke 18 at the upper end of the lever 11 as by a pin 19. This enables the cane 10 to be moved sideways or in a direction normal to that of the shifting motion described to swing the lever 17 downwardly until an adjustable stop 20 at its outer end engages and depresses a lever 21 pivotally connected to a boss 22 in the housing.

The lever 21 is connected with linkage, part of which is shown at 23, the function of which is to lock the automatic transmission referred to above in its low range position when desired. The housing is notched as at 24 adjacent the first, second and third speed positions of the cane when it is used for the manually shiftable transmission. It is conceivable in some combinations that locking of the automatic transmission will be undesirable at some speeds as for example in the third speed position of the manual transmission and this can be prevented by eliminating the notch 24 which accommodates the cane in its third speed locking position.

It is desirable that the cane be held in its locking position and it must be forcibly held therein to prevent its slipping out under vibration of machine operation. Furthermore the force required for holding the cane and linkage in the locking position is so great that unusual operator effort would normally be required to overcome it. This is highly undesirable particularly in connection with heavy equipment including many controls requiring attention and effort on the part of the operator, and the present invention provides means by which heavy springs for forcibly holding the shifting cane in its locking position may be easily overcome by an improved over-center spring locking arrangement.

The invention which is shown in FIG. 1 and the advantages of which are more readily derived from an examination of FIGS. 2, 3 and 4 comprises a pair of springs 26 anchored under tension between spring anchors 27 on the lever 11 and an anchor pin 28. The anchor pin 28 is carried at the upper end of two side parts which together with the pin form a U-shaped lever 29 pivotally supported with respect to the yoke 18 by means of pins 30 which are parallel with the pin 19. Consequently, when the lever 29 swings clockwise as viewed in the drawings, the springs 26 are tensioned to a position of maximum loading, shown in FIG. 3, when the anchors 27 and 28 are on a center line common to the pin 30 and further clockwise motion will occur under force of the springs. This loading of the springs 26 which would normally acquire undesirably great operator effort is accomplished through a compound leverage obtained by connecting the lever 17 by pins, one of which is shown at 32, to the lever 29 intermediate its end. Consequently, the shifting cane acts as a bellcrank lever having one long arm between the knob at its upper end and the pivot pin 19 and one short arm between the pivot pin 19 and pins 32. This lever with its great mechanical advantage is employed throughout the greater part of its movement for moving the small lever 29 throughout only the first portion of its movement required to bring it to its dead center position shown in FIG. 3 for loading the springs 26. Beyond this position to the position shown in FIG. 4 wherein the automatic transmission control lever 21 is fully depressed, the necessary effort has been provided by the springs. Thus, while heavy springs are employed to provide the necessary force for actuating the locking mechanism of the automatic transmission and holding it in locked position, the effort required for overcoming the force of the spring has been greatly minimized.

I claim:

A transmission control apparatus comprising, a shaft, a bell crank rotatably mounted on said shaft and having a yoke at the end of one arm thereof, the other arm having a work performing abutment at the end thereof, a spring anchor on said one arm near said shaft, a pin carried by said yoke in a plane parallel to the plane containing the said shaft, the axis of said pin being 90 degrees to the said axis of the shaft, a T-shaped lever having first and second arms extending laterally from a leg, a cane extending from said leg at 90 degrees to said arms, said leg being pivotally mounted in said yoke by said pin, said first arm terminating in a second work performing abutment, said second arm having pin means extending laterally therefrom, a U-shaped lever having the side arms thereof rotatably mounted in the yoke outwardly of said pin, said U-shaped lever having elongated openings formed in the side arms thereof, said laterally extending pin means being disposed within said openings, a spring extending between the base of the U-shaped lever and the spring anchor.

References Cited by the Examiner
UNITED STATES PATENTS

| | | | |
|---|---|---|---|
| 1,540,247 | 6/25 | Bowman | 74—97 |
| 2,917,945 | 12/59 | Curtin | 74—471 X |

BROUGHTON G. DURHAM, *Primary Examiner.*

MILTON KAUFMAN, *Examiner.*

UNITED STATES PATENT OFFICE
CERTIFICATE OF CORRECTION

Patent No. 3,184,989            May 25, 1965

Sammy J. Rhodes

It is hereby certified that error appears in the above numbered patent requiring correction and that the said Letters Patent should read as corrected below.

Column 1, line 19, for "3,102,831" read -- 3,096,667 --; line 58, for "lever 11 is" read -- lever 11 --.

Signed and sealed this 30th day of November 1965.

(SEAL)
Attest:

ERNEST W. SWIDER            EDWARD J. BRENNER
Attesting Officer            Commissioner of Patents